April 25, 1933. J. L. HODGSON ET AL 1,906,155
INDICATING OR RECORDING MECHANISM
Filed Nov. 5, 1931
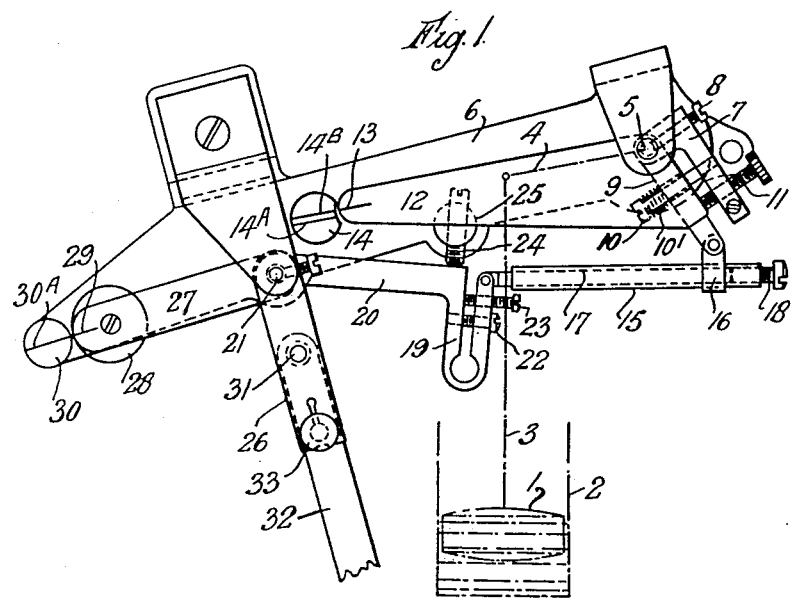
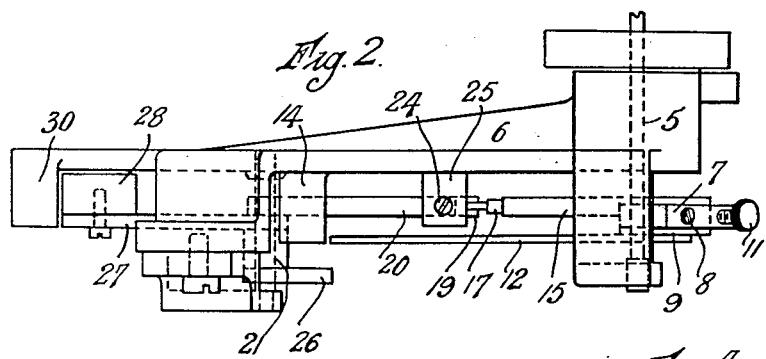
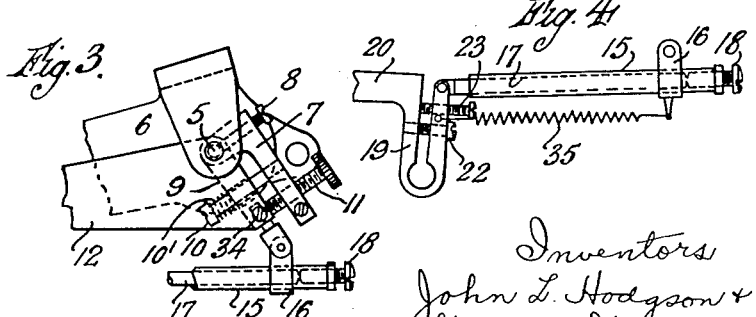
Inventors
John L. Hodgson &
ffolliott Gray
By their Attorneys,
Baldwin Wight Patented Apr. 25, 1933

1,906,155

UNITED STATES PATENT OFFICE

JOHN LAWRENCE HODGSON AND FFOLLIOTT GRAY, OF LUTON, ENGLAND, ASSIGNORS TO GEORGE KENT LIMITED, OF LONDON, ENGLAND

INDICATING OR RECORDING MECHANISM

Application filed November 5, 1931. Serial No. 573,283.

This invention relates to indicating or recording mechanism.

The invention is applicable to meters which indicate or record the flow of a fluid through a pipe and are operated by means of the differential pressure created by a pitot tube, Venturi tube, nozzle, orifice or other device for which the "flow-head" relation follows approximately a square root law. In such apparatus, equal increments of the differential pressure do not represent equal increments in the flow, so that when operated directly by an element which gives movements approximately proportional to the differential pressure, as e. g. a float on a mercury column in a U-tube the figures on the indicator scale or diagram are not equally spaced, the figures at the lower or zero end of the scale being closer together than those at the higher end of the scale.

The object of the present invention is to provide improved apparatus in which the figures over a large portion of the flow scale are evenly spaced, and in which the free zero position of the differential pressure measuring element can be accurately set. The "free zero" position referred to is that position which the measuring element such as the float in the U tube or the like occupies when there is no flow thru the Venturi tube, nozzle, orifice or like device. In prior constructions, the float is connected to an indicating mechanism and is under mechanical constraint by reason of this connection and the zero position of the float (i. e. the lowest position which the float can occupy) is governed by the limiting position of the pen mechanism.

If at a certain position the float is allowed to be detached from the indicating mechanism so that it is entirely free therefrom, then the float will be allowed to take up a natural or "free zero" position entirely without restraint.

In carrying out the invention the shaft which is rocked by the meter float or other element giving movements approximately proportional to the differential pressure (hereinafter referred to as the meter shaft) is provided with an arm connected by a link to an arm on a shaft which carries an index pointer or pen and hereinafter referred to as the pen shaft. The arm on the meter shaft, the arm on the pen shaft, and the link, are so arranged that when the meter registers zero, the index pointer or pen arm (hereinafter referred to as the pen) could register a natural or free zero only if the axis of the pen shaft, the pivotal axis of connection between the arm on the pen shaft and the link, and the pivotal axis of connection between the arm on the meter shaft and the link, were in the same plane. In normal operation these parts are prevented by a stop from coming to this position since the link and arm on the pen shaft would in that position form a toggle, and the joint between them would not break. As a result of this the pen in normal operation cannot return to the free zero position. In order to permit the meter shaft to move to its zero position for the purpose of zeroizing, the parts are so arranged that the stop checks the movement of the pen shaft but not of the meter shaft which becomes mechanically detached from connection with the pen shaft or alternatively can be manually detached from it when desired; and means are provided for accurately setting the position of the arm on the meter shaft and means for accurately setting the index pointer or pen on the pen shaft.

In the accompanying drawing, which illustrates the invention, Figure 1 is a front elevation, Figure 2 a plan, and Figures 3 and 4 are detail views.

1 shows diagrammatically a float which is raised or lowered by variations in the level of liquid contained in a chamber 2 forming one limb of the U tube subjected to the differential pressure. The float is connected by a rod 3 to a lever 4 fast on a meter shaft 5 which is rotatably mounted on a main frame 6. 7 is an arm which is secured in position on the shaft 5 by a screw 8 and 9 is a second arm which is loosely mounted on the shaft 5. The arms 7, 9 together constitute a two part crank arm and tend to be drawn towards one another by means of a spring 10' on the headed stud 10 which passes freely through a hole in the arm 9 and which is fixed in the arm 7. The distance between the ends of the arms can be regulated by means of a screw 11. The arm 9 is provided with a plate 12 having at its outer end an engraved line or other mark 13 which, when the float is in its lowest i. e. its free zero position can come into register with a mark 14 A on a stud 14 which is fixed on the main frame. The stud 14 may also be provided with a second mark 14 B which should register with the mark 13 when the parts are in the position as shown in Figure 1. 15 is a tube provided with a bracket 16 which is pivoted to the end of the arm 9. Located within the tube 15 is a rod 17 one end of which is adapted to bear against a screw 18 screwing into the end of the tube 15. The other end of the rod 17 is pivoted to a slitted block 19 on the end of an arm 20 fast with a shaft 21. The two parts of the slitted block can be drawn towards one another by means of a screw 22, the distance between the slitted parts being regulated and locked by a screw 23. 24 is a screw carried by a stud 25 fast on the main frame 6 and serving to limit the movement of the arm 20. Fast on the shaft 21 is a holder 26 for a pen or pointer, the shaft 21 also being provided with an arm 27 carrying a weight 28. Frictionally pivoted at 31 to the holder 26 is a pen 32 the holder also being provided with an eccentrically pointed screw 33 whereby the pen 32 can be adjusted. The arm 27 may also be provided with an engraved line 29 adapted to register with a mark 30 A on a stud 30 fixed on the main frame 6. Figure 3 shows a detail view of a modification in which the effective length of the arm 9 is made adjustable by making it telescopic, the parts being secured in position by a screw 34. Figure 4 shows a modification in which a spring 35 is provided to keep the rod 17 in contact with the adjusting screw 18. In this modification the weight 28 is dispensed with.

It will be clear that if the chart over which the pen moves is calibrated so as to commence at say $\frac{1}{10}$th of the maximum flow (i. e. the chart is not calibrated to indicate values between zero and $\frac{1}{10}$th the maximum flow) then there is a definite position in the movement of the float from its free zero position when the float should pick up the pen mechanism. In other words, the float will move through a definite distance when the flow rises from zero to $\frac{1}{10}$th of the full flow, and to obtain an accurate record, the pen mechanism should be picked up by the float exactly at the end of this movement of the latter.

Since the free zero position may vary, as for example by a slight variation in the quantity of mercury or other liquid in the float chamber or even by slight variations in the length of the mechanical connections to the float, and since the distance through which the float moves from its free zero position to $\frac{1}{10}$th full flow is constant, this variation of the free zero position of the float would cause the latter to pick up the mechanism at different points in its movement and cause inaccurate registration unless the connections between the float and the pen are adjusted to compensate for the variations in the free zero position.

By adjusting the screw 11 the point of pick up is varied to compensate for differences in the free zero position of the float and of the plate 12. The line 14—A is marked in a position such that the line 13 will register with the line 14A when the float is in it free zero position and the extent of movement of the arm or plate 12 in a clockwise direction from the position in which the line 13 registers with the line 14A to the position in which the screw 18 just abuts against the rod 17 is exactly proportional to the movement of the float from its free zero position to a position corresponding to $\frac{1}{10}$th of full flow. It will be clear that if the line 13 were not in registry with the line 14A when the float is in its lowest or free zero position, the float would pick up the pen mechanism at the wrong time, but by adjusting the screw 11 the arm 12 can be adjusted so that the line 13 will register with the line 14A when the float is in its free zero position.

The screw 33 is provided to enable the pen to be adjusted so that when the arm 20 is in contact with the screw 24 the pen lies on the datum line of the chart, that is, the minimum line of registration of the chart corresponding to $\frac{1}{10}$th of full flow.

The correct adjustment of the stop screw 24 is such that the arm 20 is just on the point of leaving the stop when the flow reaches a specified amount corresponding to the lowest flow line marked on the diagram, which, as stated above, may be $\frac{1}{10}$th of the maximum flow which the apparatus is designed to measure.

When the apparatus is calibrated as described above the correct positions of the stop screw 24, the link adjusting screw 18, the length adjustment on the arm 20, and the length adjustment on the arm 9 is provided, are ascertained, and each of these adjustments is pinned or otherwise secured in its correct position.

The index line 14B if used, is marked to indicate the position of the plate 12 when the arm 20 is in contact with the stop screw 24 and the telescopic link is not extended. The index lines 29 and 30A may also be marked to indicate the correct position of the arm 27 when the arm 20 is in contact with the screw 24.

The index lines 14B, 29, and 30A are only required to detect the occurrence of subsequent changes of length or deformation of the telescopic link, the arms 9 and 20 or their spindles or the frame carrying them, or the displacement of the stop 24, and can therefore be dispensed with if those parts are sufficiently rigid.

In operation when the flow falls below the minimum which can be registered on the diagram, the screw 18 leaves the rod 17 and thus the actuating float mechanism is released from mechanical restraint by the pen mechanism and the free zero position of the float mechanism can be checked and adjusted, this adjustment as previously stated, being effected by the screw 11 which is adjusted so that the lines 13 and 14A are coincident when the float is in its lowest position. The screw 33 is then turned so that the point of the pen lies on that flow line on the diagram with which the adjustment of the stop screw was made to correspond.

It is obvious that a similar checking and adjustment of the free zero position of the float could be obtained by manually effecting disconnection between the actuating float mechanism and the pen mechanism to free the float mechanism from constraint when the arm 20 is in engagement with the stop screw 24, this could conveniently be effected by substituting for the rod 17 a link or arm having a forked end which normally receives a pin on the arm 9 so as however to enable the link or arm to be swung clear of the pin. In the illustrative embodiment of the invention disclosed herein, the tube 15, with its screw 18, and the rod 17 constitute a lost motion connection which is adapted to effect driving connection between the actuating arm 7—9 and the pen holder 26 during only a selected part of the range of movement of the actuating arm.

It will be seen that all the parts are mounted on the main frame 6 thereby forming a self-contained unit which can be fitted to a meter which originally was designed to record in head (according to the motion of the meter actuated shaft) instead of according to the square root of the head, as the present invention enables it to do.

In the claims which follow the terms "pen shaft" and "pen arm" are intended to include a shaft and arm for an index pointer as well as for a pen.

What we claim is:—

1. In indicating or recording apparatus, the combination of an actuating mechanism, including a crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating the true free zero position of the actuating mechanism, and means for effecting an adjustment of the free zero position of the actuating mechanism.

2. In indicating or recording apparatus, the combination of an actuating mechanism, including a crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating the true free zero position of the actuating mechanism, means for effecting an adjustment of the free zero position of the actuating mechanism, and a support for the crank arm, pen shaft and associated parts, whereby the apparatus can be fitted to an existing differential pressure responsive apparatus.

3. In indicating or recording apparatus, the combination of an actuating mechanism, including a two part crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating the true free zero position of the actuating mechanism, and means for effecting an adjustment of the free zero position of the actuating mechanism comprising a device for effecting an angular adjustment of the two parts of the crank arm.

4. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating the true free zero position of the actuating mechanism, and means for effecting an adjustment of the free zero position of the actuating mechanism.

5. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, the link being formed in two parts provided with abutments which normally co-operate to transmit movement from the crank arm to the arm on the pen shaft and move out of co-operation when the latter arm is positioned by the stop so that the actuating mechanism is freed from constraint, a stop which prevents the axis of connection between the link and the arm on the pen shaft from lying in the plane containing the axis of connection between the link and the crank arm and the axis of the pen shaft, means for indicating the true free zero position of the actuating mechanism, and means for effecting an adjustment of the free zero position of the actuating mechanism.

6. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being adapted for manually effecting disconnection between the crank arm and the arm on the pen shaft when this latter is positioned by the stop so that the actuating mechanism is freed from constraint, means for indicating the true free zero position of the actuating mechanism, and means for effecting an adjustment of the free zero position of the actuating mechanism.

7. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally co-operate to transmit movement from the crank arm to the arm on the pen shaft and move out of co-operation when the latter arm is positioned by the stop so that the actuating mechanism is freed from constraint, means for causing the abutments to be biased towards each other with a known force, means for indicating the true free zero position of the actuating mechanism, and means for effecting an adjustment of the free zero position of the actuating mechanism.

8. In indicating or recording apparatus, the combination of an actuating mechanism, including a two part crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally co-operate to transmit movement from the crank arm to the arm on the pen shaft and move out of co-operation when the latter arm is positioned by the stop so that the actuating mechanism is free from constraint, means for indicating the true free zero position of the actuating mechanism, and means for effecting an adjustment of the free zero position of the actuating mechanism comprising a device for effecting an angular adjustment of the two parts of the crank arm.

9. In indicating or recording apparatus, the combintion of an actuating mechanism, including a two part crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally co-operate to transmit movement from the crank arm to the arm on the pen shaft and move out of co-operation when the latter arm is positioned by the stop so that the actuating mechanism is freed from constraint, means for causing the abutments to be biased towards each other with a known force, means for indicating the true free zero position of the actuating mechanism, and means for effecting an adjustment of the free zero position of the actuating mechanism, comprising a device for effecting an angular adjustment of the two parts of the crank arm.

10. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally cooperate to transmit movement from the crank arm to the arm on the pen shaft and move out of co-operation when the latter arm is positioned by the stop so that the actuating mechanism is freed from constraint, means for indicating the true free zero position of the actuating mechanism, means for effecting an adjustment of the free zero position of the actuating mechanism, and a support for the crank arm, pen shaft and associated parts, whereby the apparatus can be fitted to an existing differential pressure responsive apparatus.

11. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being adapted for manually effecting disconnection between the crank arm and the arm on the pen shaft when this latter is positioned by the stop so that the actuating mechanism is freed from constraint, means for indicating the true free zero position of the actuating mechanism, means for effecting an adjustment of the free zero position of the actuating mechanism, and a support for the crank arm, pen shaft and associated parts whereby the apparatus can be fitted to an existing differential pressure responsive apparatus.

12. In indicating or recording apparatus, the combination of an actuating mechanism, including a two part crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally cooperate to transmit movement from the crank arm to the arm on the pen shaft and move out of co-operation when the latter arm is positioned by the stop so that the actuating mechanism is freed from constraint, means for indicating the true free zero position of the actuating mechanism, means for effecting an adjustment of the free zero position of the actuating mechanism comprising a device for effecting an angular adjustment of the two parts of the crank arm, and a support for the crank arm, penshaft and associated parts, whereby the apparatus can be fitted to an existing differential pressure responsive apparatus.

13. In indicating or recording apparatus, the combination of an actuating mechanism, including a two part crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally cooperate to transmit movement from the crank arm to the arm on the pen shaft and move out of co-operation when the latter arm is positioned by the stop so that the actuating mechanism is freed from constraint, means for causing the abutments to be biased towards each other with a known force, means for indicating the true free zero position of the actuating mechanism, means for effecting an adjustment of the free zero position of the actuating mechanism comprising a device for effecting an angular adjustment of the two parts of the crank arm, and a support for the crank arm, pen shaft and associated parts, whereby the apparatus can be fitted to an existing differential pressure responsive apparatus.

14. In indicating or recording apparatus, the combination of an actuating mechanism, including a crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when stop is operative, means for indicating the true free zero position of the actuating mechanism, means for effecting an adjustment of the free zero position of the actuating mechanism, an indicating device for indicating the correct position of the pen shaft when the stop becomes operative, and an indicating device for indicating the correct position of the actuating mechanism corresponding to the stopped position of the pen mechanism.

15. In indicating or recording apparatus, the combination of an actuating mechanism, including a crank arm mounted for movements in response to pressure variation, a pen shaft, an angularly adjustable pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, the link being formed in two parts provided with abutments which normally co-operate to transmit movement from the crank arm to the arm on the pen shaft and move out of co-operation when the latter arm is positioned by the stop so that the actuating mechanism is freed from constraint, means for indicating the true free zero position of the actuating mechanism, means for effecting an adjustment of the free zero position of the actuating mechanism, an indicating device for indicating the correct position of the pen shaft when the stop becomes operative, and an indicating device for indicating the correct position of the actuating mechanism corresponding to the stopped position of the pen mechanism.

16. In indicating or recording apparatus, the combination of an actuating mechanism, including a crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating at a point adjacent the point of disconnection the true free zero position of the actuating mechanism, and means for effecting an adjustment of the free zero position of the actuating mechanism at a point adjacent the point of disconnection.

17. In indicating or recording apparatus, the combination of an actuating mechanism, including a crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating at a point adjacent the point of disconnection the true free zero position of the actuating mechanism, means for effecting an adjustment of the free zero position of the actuating mechanism at a point adjacent the point of disconnection, and a support for the crank arm, pen shaft and associated parts whereby the apparatus can be fitted to an existing differential pressure responsive apparatus.

18. In indicating or recording apparatus, the combination of an actuating mechanism, including a two part crank arm mounted for movements in response to pressure variation, a pen shaft, a pen carrier on the shaft, an arm on the shaft, a link for connecting the crank arm to the arm on the pen shaft, a stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating at a point adjacent the point of disconnection the true free zero position of the actuating mechanism, and means for effecting an adjustment of the free zero position of the actuating mechanism at a point adjacent the point of disconnection, comprising a device for effecting an angular adjustment of the two parts of the crank arm.

19. In indicating or recording apparatus, the combination of an actuating mechanism, including a two part crank arm mounted for movements in response to pressure variation, means for effecting adjustment of the length of one arm of the crank arm, a pen shaft, an angularly adjustable pen carrier on the shaft, an arm on the shaft, means for effecting adjustment in the length of said pen shaft arm, an adjustable link for connecting the crank arm to the arm on the pen shaft, an adjustable stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating the true free zero position of the actuating mechanism, means for effecting an adjustment of the free zero position of the actuating mechanism, and means for maintaining adjustment of said stop, the length of said pen shaft arm, said crank arm, and said link.

20. In indicating or recording apparatus, the combination of an actuating mechanism, including a two part crank arm mounted for movements in response to pressure variation, means for effecting adjustment of the length of one arm of the crank arm, a pen shaft, an angularly adjustable pen carrier on the shaft, an arm on the shaft, means for effecting adjustment in the length of said pen shaft arm, an adjustable link for connecting the crank arm to the arm on the pen shaft, an adjustable stop which prevents the axis of connection between the link and the arm on the pen shaft from lying in the plane containing the axis of connection between the link and the crank arm and the axis of the pen shaft, means for effecting disconnection between the actuating mechanism and the pen mechanism to free the former from constraint by the latter when the stop is operative, means for indicating the true free zero position of the actuating mechanism, means for effecting an adjustment of the free zero position of the actuating mechanism, an indicating device for indicating the correct position of the pen shaft when the stop becomes operative, an indicating device for indicating the correct position of the actuating mechanism corresponding to the stopped position of the pen mechanism, and means for maintaining adjustment of said stop, the length of said pen shaft arm, said crank arm, and said link.

In testimony that we claim the foregoing as our invention we have signed our names this 16th day of October, 1931.

JOHN LAWRENCE HODGSON.
FFOLLIOTT GRAY.